United States Patent Office 3,456,732
Patented July 22, 1969

3,456,732
OIL RECOVERY METHOD USING POLY-
ETHOXYLATED HALOGEN-SUBSTI-
TUTED PHENOL SURFACTANTS
Charles A. Stratton, Bartlesville, Okla., assignor to Phillips Petroleum Company, a corporation of Delaware
No Drawing. Filed Jan. 2, 1968, Ser. No. 694,825
Int. Cl. E21b 43/16, 43/20
U.S. Cl. 166—274                                  9 Claims

ABSTRACT OF THE DISCLOSURE

Oil is recovered from oil-bearing stratum by injecting an aqueous slug containing polyethoxylated halogen-substituted phenol into the stratum, driving the slug through the stratum to displace oil and recovering the displaced oil from a well bore in the stratum.

---

This invention relates to recovering oil from oil-bearing stratum by aqueous fluid drive.

The production of oil by aqueous fluid drive, such as water flooding or steam flooding, is a conventional method of recovering oil. However, water flooding leaves a substantial portion of the oil in the formation and this oil is substantially unrecoverable by continued flooding. While steam flooding is generally more effective than water flooding, it also leaves unrecoverable oil in the stratum. Various types of surfactants have been injected into the oil-bearing stratum with or in advance of the aqueous flooding medium to improve oil recovery. Not all surfactants have oil releasing properties; in one instance 335 surfactants were tested and only 11 had the ability to displace oil from an oil sand.

It is known that the addition of minute solids, such as carbon black, which act as surfactant carriers in a surfactant-containing aqueous slug improves the efficiency of the method. While certain surfactants for use in combination with a surfactant carrier are known, it is desirable that other surfactants for use in such a process be made available.

Accordingly it is an object of the invention to efficiently recover oil from a subsurface stratum.

Another object of the invention is to provide an improved aqueous fluid drive process utilizing surfactants for the production of oil.

Other objects and advantages of the invention will be apparent to one skilled in the art upon consideration of the specification and appended claims.

According to the invention, there is provided a method of producing oil from an oil-bearing stratum comprising injecting into the stratum through a well bore therein an aqueous slug containing, as an oil-displacing surfactant, polyethoxylated, halogen-substituted phenol so as to displace oil and recovering the displaced oil from a well bore penetrating the stratum.

Suitable polyethoxylated halogen-substituted phenols include compounds represented by the following formula:

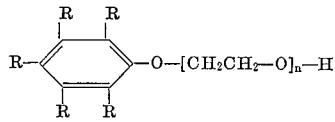

wherein R represents hydrogen or an alkyl having from 4 to 24 carbon atoms or a halogen substituent, at least one halogen substituent being present; and $n$ has a value in the range of from 4 to 22, preferably from 4 to 10. The preferred halogens are chlorine and bromine. One especially effective member of this class or surfactants is polyethylene oxide pentachlorophenol.

The concentration of the above-described surfactant in the aqueous slug is in an effective amount, generally in the range of 0.001 to 5 and preferably 0.01 to 1 weight percent of the slug.

Further in accordance with the invention, there is provided a method of recovering oil from an oil-bearing stratum comprising injecting an aqueous slug containing a polyethoxylated halogen-substituted phenol and also containing a surfactant carrier comprising suspended minute solids capable of being driven through the stratum in a substantial and effective concentration, and driving the slug away from the well so as to displace oil from the stratum. The concentration of minute suspended solids in the aqueous slug is in the range of 0.05 to 2 weight percent. Suitable solids include 0.001 to 1 micron sized particles of carbon black, kaolin and talc. The amount of the injected slug lies in the range of 0.1 to 1 pore volume although lesser and greater amounts may be utilized depending upon the pore size and character of the oil-bearing stratum being produced.

In one embodiment of the invention, the slug, containing the above-described oil-displacing surfactant and suspended solids is stabilized by the addition of a nonionic surfactant having the formula R—O—R'—OH wherein R is an aliphatic alkyl of 5 to 20 carbon atoms or an alkylaryl the alkyl having 8 to 12 carbon atoms and the aryl is attached to the O, and R' is a polyethylene oxide of an average of 30 to 100 units. Surfactants of this class have little of no oil-displacing capacity but have good dispersing qualities. These surfactants stablize the suspension and minimize the premature precipitation of the particulate solid surfactant carrier.

After injection, the aqueous slug containing the polyethoxylated halogenated phenol is either driven through the stratum towar an offset production well or the pressure on the injection well is reduced so that the slug moves back into the injection well, carrying the displaced oil into the injection well for production therefrom by conventional means such as pumping. When the process is applied to a single well, the injection, drive, and release of pressure steps are repeated until the procedure is no longer economical. The preferred method comprises driving the injected slug with a suitable driving fluid to one or more offset wells which may lie in a ring pattern around the injection well or in parallel lines of production wells on opposite sides of the injection well.

The driving fluid may be water, steam or a suitable gas such as air or combustion gas. Liquid hydrocarbons may be utilized as driving fluid.

The following examples will serve to further illustrate the invention.

Example I

Pentachlorophenol was reacted with ethylene oxide by bubbling the gas through the liquid and maintaining a temperature of from 120 to 180° C. for from about 1 to 8 hours. The ethylene oxide was bubbled through the pentachlorophenol at a rate of from about 5 to 15 grams per hour. The reaction product (polyethoxylated pentachlorophenol) contained between 3.8 and 22.1 units of ethylene oxide.

In order to obtain a preliminary indication of the oil releasing properties of the polyethoxylated pentachlorophenol, the surfactant was compared with a known oil-releasing surfactant, nonylphenoxypolyethanol (having 6 to 6.5 ethoxy groups). This preliminary indication was obtained by coating two microscope slides with crude oil having a specific gravity of .935 at 78° F. or 20 API and a viscosity of 176 cp. (centipoises) at this temperature and immersing the slides in solutions of the two surfactants. The slides were soaked in the oil and allowed to drain for identical periods of time. The slides were propped up in beakers; one beaker was filled with a 1 weight percent solution of the polyethoxylated pentachlorophenol and the other was filled with a 1 weight percent solution of the nonylphenoxypolyethanol. The solutions were made with a simulated Burbank (Oklahoma) produced brine having the following salt content: 40 grams per liter of NaCl (10.5 grams per liter of CaCl$_2$, and 4.8 grams per liter of MgCl$_2$·6H$_2$O.

After 1 hour, the slide immersed in the polyethoxylated pentachlorophenol solution was practically clean, while an appreciable amount of oil remained on the slide immersed in the polyethoxylated nonylphenol solution.

On the basis of this preliminary indication, tests were conducted in microcells. These microcells were each made from two 3″ x 1″ glass slides with a space of 15 mils between them. Flat polyethylene bars, 15 mils thick and 1/16 inch wide, were used as spacers. The slides were glued together at the edges by epoxy resin to seal the microcell. The 15 mil space between the slides and spacers was filled with a Burbank oil-wet sand. Distribution bars, which are 10 mils thick, were positioned at both ends of the sand to provide uniform flow over the cross section of the microcell. The pore volume of the cells was approximately 0.5 cc. Hypodermic needles were injected through opposite ends of the cell to provide for ingress and egress respectively of fluids.

The sand used in the test was obtained from Burbank cores by disintegration and separating the oil-wet part by froth flotation. The native crude oil used was used in the froth flotation as a collector and frother. This is necessary because crushing sandstone reduces the oil-wet properties markedly. The particle size of the sand used for the test was a 250 to 300 micron fraction.

The crude oil was obtained from a Burbank water flood production unit presumed to be free of treating chemicals. It was centrifuged to remove fine solids such as paraffin and inorganic impurities. The specific gravity of the oil was 0.835 at 78° F. or 38 API and the viscosity was 6. cp. at this temperature.

The dry oil-wet sand in the microcell was flooded with crude oil and oil was left in contact with the sand for at least 1 hour then the microcell was water flooded with 3 cc. (6 pore volumes) of the simulated brine. Immediately after water flooding, the brine solution of the polyethoxylated pentachlorophenol was injected. Upon injection of the surfactant solution the oil in the sand was observed to move ahead of the surfactant bank; good sweep patterns were developed after the injection of 1.5 ml. Very little (less than 20 percent) of the oil remained in the microcell after the injection of 2.5 cc. of the surfactant solution. These tests demonstrate the oil displacing properties of the brine solution containing polyethoxylated pentachlorophenol.

Example II

The oil displacing properties of the polyethoxylated pentachlorophenol solution under simulated field conditions were determined by tube displacement tests. A 6-foot long steel tube having a ¾ inch diameter was packed with reservoir sand from the Burbank field located in Oklahoma. The sand was packed in the tube to obtain a porosity of approximately 35 to 40 percent. The tube was wrapped with electrical heating tapes and temperature controlled to obtain a temperature of about 120° F. The tube was then flooded with the Burbank crude to obtain 100 percent oil saturation.

The tube was then flooded with the simulated Burbank brine at a rate of 1 ml. per minute and the amount of oil produced and the water-oil ratio was measured. Flooding was continued until an oil-water ratio of 100 was obtained and the percent oil saturation was then determined. After these steps, conditions in the tube approximate the conditions of a depleted water-dry reservoir.

An aqueous slug was prepared by mixing the brine solution with a surfactant carrier, a dispersing surfactant and the oil-displacing surfactant (polyethoxylated pentachlorophenol). Philblack I (a trademark of Phillips Petroleum Company) a furnace black, was used as the particulate solid surfactant carrier, illustrative of other surfactant carriers. A nonylphenoxypolyethanol having an average chain length on the hydrophilic end of about 95 to 100 units of ethylene oxide was used as the dispersing surfactant. Polyethoxylated pentachlorophenol having 21 units of ethylene oxide was used as the oil-displacing surfactant. The additive slug contained 0.4 weight percent surfactant carrier, 0.24 weight percent dispersing surfactant and 0.24 weight percent of the oil-displacing surfactant.

The tube was then flooded with the additive slug at a rate of 1 ml. per minute and a pressure of 5 to 7 p.s.i. until a water-oil ratio of about 100 in the produced fluid was obtained. The amount of additional oil produced (on a percent saturation basis) and the amount of additive slug (on a pore volume basis) was then determined.

The additive broke through or appeared at the outlet end of the tube after the injection of 1.4 pore volumes and production was continued until 2.8 pore volumes were injected. After the injection of this amount the oil-water ratio obtained was 100 and the change of oil saturation in the tube was 15.5 percent. This example demonstrates that the polyethoxylated pentachlorophenol provides a surfactant suitable for use in combination with a surfactant carrier to recover oil from a subsurface stratum.

Reasonable modification and variation are within the scope of the invention which sets forth a novel method of recovering oil.

That which is claimed is:

1. A method for producing oil from an oil-bearing stratum comprising:
   injecting into said stratum through a well bore therein an aqueous slug containing polyethoxylated halogen-substituted phenol, said phenol having from 1 to 5 halogen substituents in solution in a concentration in the range of about 0.001 to 5 weight percent so as to displace oil from said stratum; and
   recovering the displaced oil from a well bore penetrating said stratum.

2. The method of claim 1 wherein said polyethoxylated halogen-substituted phenol is represented by the formula:

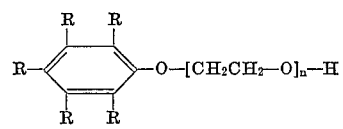

wherein R is a hydrogen or an alkyl having 4 to 24 carbon atoms at least one halogen substituent being present and $n$ has a value in the range of from 4 to 22.

3. The method of claim 2 wherein R is hydrogen or a halogen substituent.

4. The method of claim 3 wherein R is a chlorine substituent.

5. The method of claim 1 wherein said polyethoxylated halogen-substituted phenol is present in solution in a concentration in the range of 0.01 to about 1 weight percent.

6. The method of claim 1 wherein said slug contains a suspension of minute solids capable of being driven through said stratum by a driving medium.

7. The process of claim 6 wherein said solids are particles of a size in the range of 0.001 to 1 micron selected from the group consisting of carbon black, kaolin or talc.

8. The method of claim 6 wherein said slug contains a surfactant having the formula R—O—R'—OH wherein R is an aliphatic alkyl of 5 to 20 carbon atoms or an alkylaryl, the alkyl having 8 to 12 carbon atoms and the aryl is attached to the O, and R is polyethylene oxide of an average of 30 to 100 units in solution in a concentration in the range of about 0.01 to 1 weight percent.

9. The process of claim 1 wherein said stratum is penetrated by an injection and a production well including the steps of:
   driving the slug through said stratum toward said production well so as to displace oil and move the same into said production well; and
   producing the displaced oil from said production well.

References Cited
UNITED STATES PATENTS

| | | | |
|---|---|---|---|
| 3,323,589 | 6/1967 | Harvey | 166—9 |
| 3,326,287 | 6/1967 | Corrin | 166—9 |
| 3,384,171 | 5/1968 | Parker | 166—9 |
| 3,401,748 | 9/1968 | Stratton | 166—9 |

STEPHEN J. NOVOSAD, Primary Examiner